United States Patent [19]
Sado

[11] Patent Number: 5,197,565
[45] Date of Patent: Mar. 30, 1993

[54] TRANSFER FOR FOUR-WHEEL DRIVE VEHICLES

[75] Inventor: Hideki Sado, Zama, Japan

[73] Assignee: Nissan Motor Co., Ltd., Yokohama, Japan

[21] Appl. No.: 696,573

[22] Filed: May 8, 1991

[30] Foreign Application Priority Data

May 10, 1990 [JP] Japan .................. 2-120334

[51] Int. Cl.⁵ .............. B60K 17/34; B60K 17/344
[52] U.S. Cl. .................. 180/248; 475/206; 475/225; 180/374
[58] Field of Search ........... 180/248, 249, 233, 374, 180/376; 475/220, 221, 206, 225

[56] References Cited

U.S. PATENT DOCUMENTS 4,643,045 2/1987 Katayama ............... 475/221
4,974,696 12/1990 Miyajima et al. .......... 180/248
5,069,305 12/1991 Kobayashi ............... 180/249

FOREIGN PATENT DOCUMENTS 63-305032 12/1988 Japan .................. 180/248

Primary Examiner—Charles A. Marmor
Assistant Examiner—Florian Zeender
Attorney, Agent, or Firm—Foley & Lardner

[57] ABSTRACT

In a transfer for use in a transaxle for a four-wheel drive vehicle, a transfer shaft for transmission of power to rear wheels is drivingly connected to a ring gear which is in turn directly connected with a pinion gear in such a manner that a center axis of the pinion gear intersects a center axis of the ring gear at right angles and in such a manner that the center axis of the pinion gear is offset upward from the center axis of the ring gear.

7 Claims, 2 Drawing Sheets

TRANSFER FOR FOUR-WHEEL DRIVE VEHICLES

BACKGROUND OF THE INVENTION

1. Field of the Invention

The present invention relates in general to a transaxle for four-wheel drive vehicles and more particularly to a transfer for use in a transaxle for four-wheel drive vehicles.

2. Description of the Prior Art

A four-wheel drive vehicle is equipped with a transaxle having a transfer for distribution of power to front and rear wheels, as disclosed in Japanese Patent Provisional Publication No. 63-305032. The transfer of the above described publication, however, requires a spur gear, intermediate shaft and pinion which constitute a directional change gearing for transmission of power between two axes which intersect at right angles, thus resulting in a large number of constituent parts, the necessity of being disposed rearward of a front axle and, therefore, a large size.

In general, a vehicle can have an improved driving stability when a steering gear rack is disposed in a lower position for thereby making a steering linkage and a steering knuckle come closer to each other so that front wheels can have toe-in at any time of bound and rebound of the vehicle. However, in the case of the above described prior art four-wheel drive vehicle, the steering gear rack cannot be disposed in a desired lower position because it interferes with the directional change gearing. Accordingly, in the case of the prior art four-wheel drive vehicle, the steering rack must inevitably be disposed above the directional change gearing, resulting in a deterioration of the steering characteristic and therefore the driving stability.

SUMMARY OF THE INVENTION

In accordance with the present invention, there is provided a transfer for a vehicle having two wheel axles.

The transfer comprises a center differential disposed concentric with one of the wheel axles, a first transfer shaft disposed concentric with the one wheel axle, for transmitting engine power from the center differential to the one wheel axle, a second transfer shaft disposed concentric with the one wheel axle and the first transfer shaft for transmitting engine power from the center differential to the other of the wheel axles, a ring gear drivingly connected to the second transfer shaft for rotation therewith, and a pinion gear meshed with the ring gear in such a way as to have a center axis intersecting a center axis of the ring gear at right angles, in which the ring gear and the pinion gear are meshed at a place higher than the center axis of the ring gear.

The above arrangement is useful for solving the above noted problems inherent in the prior art device.

It is accordingly an object of the present invention to provide an improved transfer for a transaxle for use in a four-wheel drive vehicle which can provide an improved steering characteristic and therefore an improved driving stability.

It is a further object of the present invention to provide an improved transfer of the above described character with a reduced number of constituent parts and, therefore, simple in structure and cheap in manufacturing cost.

DETAILED DESCRIPTION OF THE PREFERRED EMBODIMENT

Figure 1:
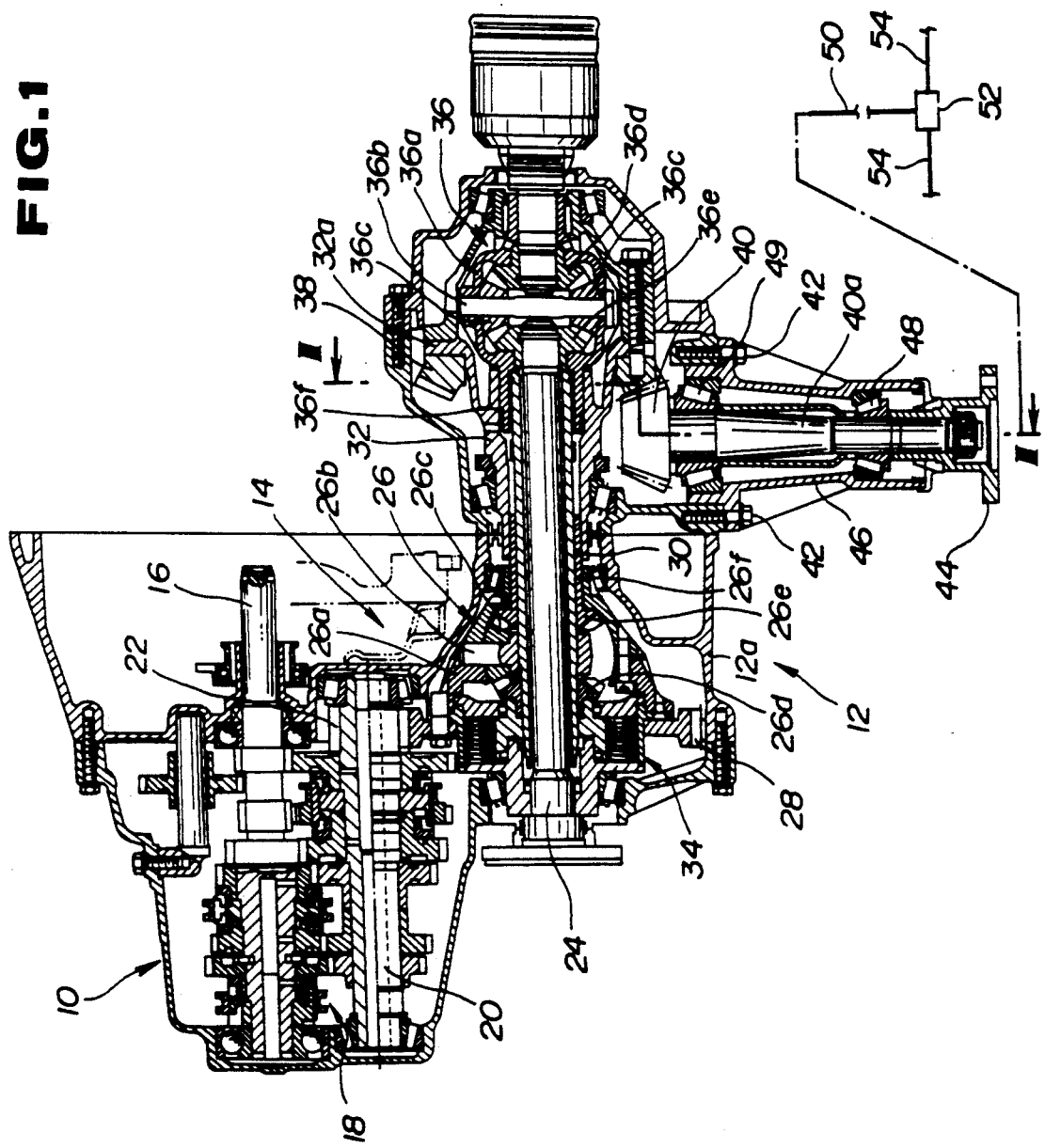
FIG. 1 is a developed, sectional view of a transaxle incorporating a transfer according to an embodiment of the present invention.
Figure 2:
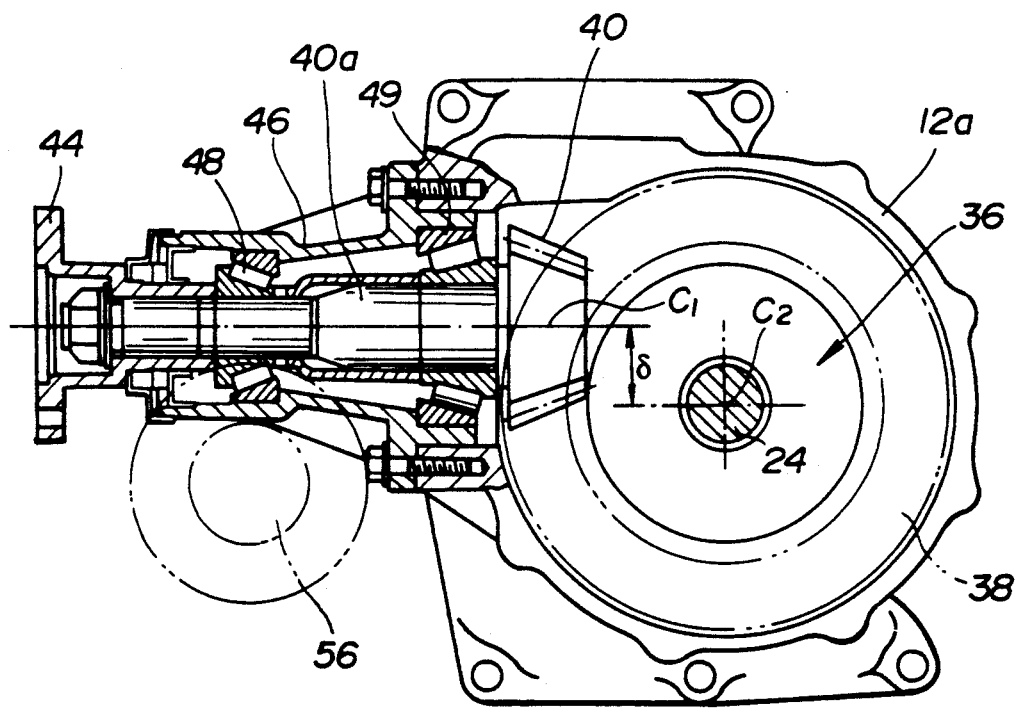
FIG. 2 is a sectional view taken along the line II—II of FIG. 1.

Referring to FIGS. 1 and 2, a transaxle consists of a transmission 10 and a transfer 12. Though not shown, an engine is located on the right-hand side of the transmission 10 so that engine power is supplied through a clutch 14 to an input shaft 16 of the transmission 10.

The engine power supplied to the input shaft 16 is transferred through a speed change gearing 18 to an output shaft 20. From the output shaft 20, engine power is supplied to the transfer 12.

The transfer 12 is disposed concentric with a front axle 24 of a vehicle and operable to distribute engine power to front and rear wheels (not shown) by way of a center differential 26.

The center differential 26 consists of a differential case 26a having installed thereon a ring gear 28 meshed with the output gear 22, a pinion mate gear 26c installed on a pinion mate shaft 26b integral with the differential case 26a, and a pair of side gears 26d and 26e meshed with the pinion mate gear 26c and having a center axis intersecting or crossing a center axis of the pinion mate gear 26c at right angles.

The side gear 26d is used for driving the front wheels and is internally splined to a hollow, cylindrical transfer shaft 30 for front wheel drive. On the other hand, the side gear 26e is used for driving the rear wheels and is relatively rotatably installed on the transfer shaft 30 for front-wheel drive and has a sleeve 26f externally splined to a transfer shaft 32 for rear-wheel drive.

Disposed between the differential case 26a and the transfer shaft 30 for front-wheel drive is a viscous coupling 34 for restricting relative movement therebetween.

Disposed at an axially intermediate portion of the front axle 24 is a front differential 36 for the front wheels. The front differential 36 consists of a differential case 36a, a pinion mate shaft 36b, a pair of pinion mate gears 36c and 36c, and a pair of side gears 36d and 36e, which side gears 36d and 36e are connected with axially separated, left and right sections of the front axle 24.

The differential case 36a of the front differential 36 is internally splined to the other end portion of the transfer shaft 30 for front-wheel drive and driven by engine power distributed thereto from the center differential 26.

On the other hand, the other end portion of the transfer shaft 32 for rear-wheel drive is relatively rotatably installed on a boss portion 36f of the differential case 36a of the front differential 36 and is formed with an outward flange 32a to which a ring gear 38 in the form of a bevel gear is secured.

The ring gear 38 is meshed with a pinion gear 40 having a shaft section 40a the center axis of which extends in the longitudinal direction of the vehicle, i.e., an axis of rotation of the pinion gear 40 extends so as to intersect or cross an axis of rotation of the front axle 24 or the ring gear 38 at right angles.

The shaft section 40a of the pinion gear 40 is provided at an end portion thereof with a coupling 44 which in turn is connected to a propeller shaft 50.

Engine power distributed to the rear wheel side by means of the center differential 26 is transferred through the transfer shaft 32 for rear-wheel drive, ring gear 38, pinion gear 40 and propeller shaft 50 to a rear differential 52 for the rear wheels from which it is distributed to a rear axle 54 for driving the rear wheels.

The shaft section 40a of the pinion gear 40 is rotatably supported on a pinion housing 46 which is secured to the housing 12a with bolts 42, by way of bearings 48 and 49.

The pinion gear 40 is meshed with the ring gear 38 as shown in FIG. 2, that is, the center axis $C_1$ of the pinion gear 40 is offset upward from the center axis $C_2$ of the ring gear 38 by a distance $\delta$.

Such an offset arrangement of the pinion gear 40 allows the pinion housing 46 to be disposed in its entirety at a higher position.

In the foregoing arrangement, it is to be noted that the ring gear 38 provided to the transfer shaft 32 for the rear wheels is directly meshed with the pinion gear 40 for transmission of engine power allotted to the rear wheels by means of the center differential 26. Accordingly, it will be understood that the transfer of this invention is simple in structure and, therefore, is compact because its directional change gearing section is constituted by the ring gear 38 and the pinion gear 40 and does not require an idler shaft as in the prior art device.

It is further to be noted that the center axis $C_1$ of the pinion gear 40 is offset upward from the center axis $C_2$ of the ring gear 38. This makes it possible to dispose the steering gear rack 56 under the pinion housing 46 and, therefore, the steering linkage can be disposed in a lower position, i.e., the steering linkage and the steering knuckle can be disposed at levels nearly horizontal to each other. Accordingly, by disposing the steering gear rack 56 in a lower position, the front wheels can have toe-in at any time of bound and rebound, thus making it possible to improve the driving stability of the four-wheel drive vehicle considerably.

While the transfer of this invention has been described and shown as being applied to a vehicle having an engine at the front, this is not limiting and the invention can be applied to a vehicle having an engine at the rear, such as a mid-ship car.

What is claimed is:

1. A vehicle comprising:

two wheel axles;

a transfer having a center differential disposed concentric with one of the wheel axles, a first transfer shaft disposed concentric with the one wheel axle for transmitting engine power from said center differential to the one wheel axle, a second transfer shaft disposed concentric with the one wheel axle and said first transfer shaft for transmitting engine power from said center differential to the other of the wheel axles, a ring gear drivingly connected to said second transfer shaft for rotation therewith, and a pinion gear meshed with said ring gear in such a manner that a center axis of said pinion gear intersects a center axis of said ring gear at right angles and that a place where said pinion gear and said ring gear are meshed with each other is located higher than the center axis of said ring gear; and a steering gear rack disposed under said pinion gear.

2. A vehicle as claimed in claim 1, wherein said first transfer shaft is hollow to receive therewithin the one wheel axle, and said center differential has a pair of side gears one of which is splined to one end portion of said first transfer shaft.

3. A vehicle as claimed in claim 2, further comprising a differential for the one wheel axle, said differential having a differential case including a boss portion for receiving the other end portion of said first transfer shaft, said boss portion being internally splined to the other end portion of said first transfer shaft.

4. A vehicle as claimed in claim 3, wherein said second transfer shaft is hollow to receive at one end portion a sleeve section of the other of said side gears of said center differential and to receive at the other end portion said boss portion of said differential case of said differential for the one wheel axle, said second transfer shaft being internally splined at the one end portion to said sleeve section of said other side gear of said center differential.

5. A vehicle as claimed in claim 4, wherein said second transfer shaft has at the other end portion an outward flange for installing thereon said ring gear.

6. A vehicle as claimed in claim 5, wherein the one wheel axle is a front axle and the other wheel axle is a rear axle.

7. In a four-wheel drive vehicle having two wheel axles, a transfer having a center differential concentric with one of the wheel axles, a first transfer shaft concentric with the one wheel axle for transmitting engine power from said center differential to the one wheel axle, a second transfer shaft concentric with the one wheel axle and said first transfer shaft for transmitting engine power from said center differential to the other of the wheel axles, a ring gear in the form of a bevel gear and drivingly connected to said second transfer shaft for rotation therewith, and a pinion gear meshed with said ring gear in such a manner that an axis of rotation of said pinion gear intersects an axis of rotation of said ring gear at right angles and that the axis of rotation of said pinion gear is disposed higher than the axis of rotation of said ring gear; and a steering gear rack disposed under a shaft section of said pinion gear.

* * * * *